United States Patent [19]

King

[11] 4,189,259
[45] Feb. 19, 1980

[54] ARTICLE HANDLING AND ADVANCING

[75] Inventor: James F. King, Winston-Salem, N.C.

[73] Assignee: Hanes Corporation, Winston-Salem, N.C.

[21] Appl. No.: 947,721

[22] Filed: Oct. 2, 1978

[51] Int. Cl.² .................................... B65G 53/04
[52] U.S. Cl. .................................... 406/63; 406/31
[58] Field of Search .................. 406/63, 62, 28, 31, 406/64, 65, 66, 67, 68; 124/48

[56] References Cited

U.S. PATENT DOCUMENTS

| | | | |
|---|---|---|---|
| 1,192,604 | 7/1916 | Burton | 406/28 |
| 2,818,964 | 1/1958 | Picard et al. | 406/62 X |
| 2,988,402 | 6/1961 | Policansky | 406/62 |
| 3,178,235 | 4/1965 | Zimmermann | 406/63 |
| 3,207,559 | 9/1965 | Poteat et al. | 406/31 |
| 3,365,239 | 1/1968 | Molins et al. | 406/62 |
| 3,453,028 | 7/1969 | Foreman | 406/28 X |
| 3,945,682 | 3/1976 | Hoagland et al. | 406/62 |

Primary Examiner—Robert B. Reeves
Assistant Examiner—Gene A. Church
Attorney, Agent, or Firm—Charles Y. Lackey; William S. Burden

[57] ABSTRACT

A system for receiving articles fed thereto sequentially at random rates, temporarily storing the articles, and advancing the articles therefrom sequentially at a constant rate of feed to an article processing machine, includes a rotatable magazine having a plurality of storage cylinders rotatable about a common axis, an escapement mechanism for directing an article to an empty cylinder and capable of displacement relative to the magazine, and means for sequentially ejecting the articles from the cylinders in timed relation with the operation of a further article processing machine.

14 Claims, 7 Drawing Figures

ARTICLE HANDLING AND ADVANCING

BACKGROUND, BRIEF SUMMARY AND OBJECTS OF THE INVENTION

This invention relates generally to a system for receiving, at random, discrete articles from a source, while simultaneously discharging therefrom, sequentially, the discrete articles at a constant rate of feed. More particularly, the invention includes a system having a rotary magazine or turret assembly for receiving discrete articles advanced thereto at random by a operator, temporarily storing the articles within the rotary magazine and subsequently feeding sequentially the articles therefrom at a constant rate and/or in timed relation with other processing or packaging equipment.

The system is of particular importance where articles are to be directed to a loading station of an article packaging machine operating at a constant rate of feed, as disclosed, for example, in copending U.S. Pat. Application Ser. No. 908,231 filed May 22, 1978 of J. Frank King, and assigned to the assignee of the present invention.

Although the invention will be described in conjunction with a constant supply or advancement of articles, particularly hosiery articles such as pantyhose garments, to a packaging machine, the invention may have general application in the handling and/or packaging of various other articles, particularly where it is desirable to direct randomly fed articles to a machine at a constant rate of feed.

Briefly, an operator randomly positions, sequentially, pantyhose garments adjacent the opening of a fluid conveyor. Air currents convey each garment through a loading conduit which is displaceable to present each garment to an empty receiver or cylinder of a plurality of storage cylinders defining a storage magazine.

The storage cylinders defining the magazine are arranged in generally parallel, side-by-side relation for rotation about a common axis. The exit end of the loading conduit is capable of displacement within an arc of approximately 300 degrees relative to the magazine to present a garment to an empty storage cylinder. The magazine preferably is driven at a constant rate of speed in timed relation with an associated packaging or other selected machine, and when an operator feeds the garments to the end of the loading tube and subsequently to the storage cylinders of the magazine at a rate faster than the garments are fed from the storage cylinders to a packaging machine, the displaceable loading tube swings through an arc in a direction counter to the direction of rotation of the magazine. The constantly rotating magazine sequentially presents each individual storage cylinder in alignment with a discharge tube where an air pressure differential directs the garment from the storage cylinder, through the discharge tube.

The constant rate of feed of the garments of the magazine through the discharge tube into a packaging machine must correspond to the rate of garment packaging by the packaging machine in order to prevent the possibility of the packaging machine forming a container package without a garment therein. For example, if the packaging machine is capable of packaging sixty garments per minute, a corresponding number of garments must be removed from the magazine and directed through the discharge tube to a loading station where the garments are sequentially directed to article receiving members on the packaging machine. Consequently, an operator must feed an average of sixty garments per minute to the fluid conveyor opening, although the operator may feed the garments at widely vary rates.

One of the primary objects of the invention is the provision of a system for receiving sequentially randomly fed articles, temporarily storing the articles, and discharging the articles sequentially at a constant rate of feed to a processing apparatus.

Another object of the invention is a provision of a system for insuring the desired feeding of articles to a packaging apparatus while eliminating significant control by an operator.

A further object of the invention is the provision of the reliable, durable and economical system for advancing articles in a controlled manner to a processing machine.

DETAILED DESCRIPTION OF THE INVENTION

Figure 1:
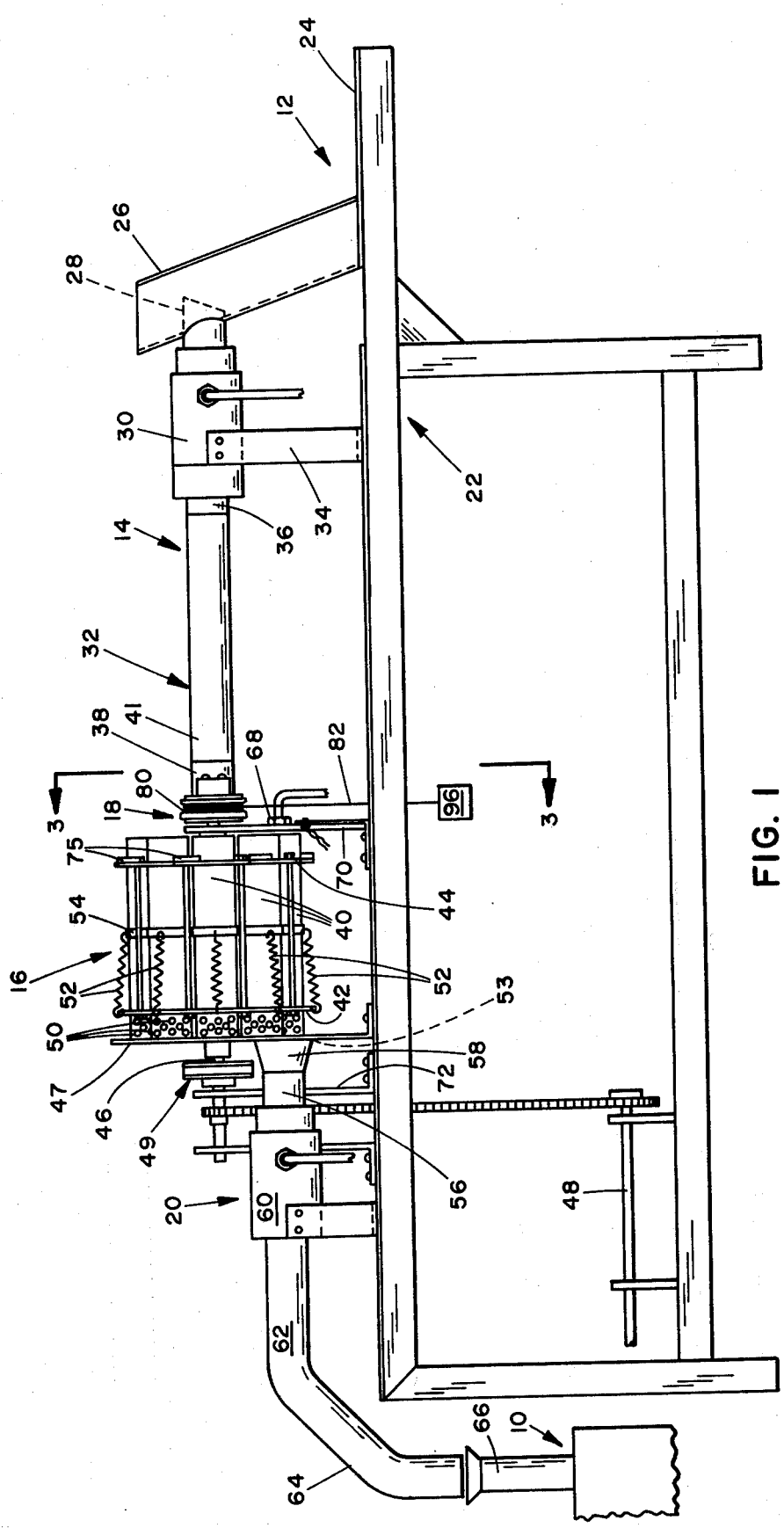
FIG. 1 is a side elevational view of a hosiery article advancing and storage apparatus constructed in accordance with the present invention.
Figure 2:
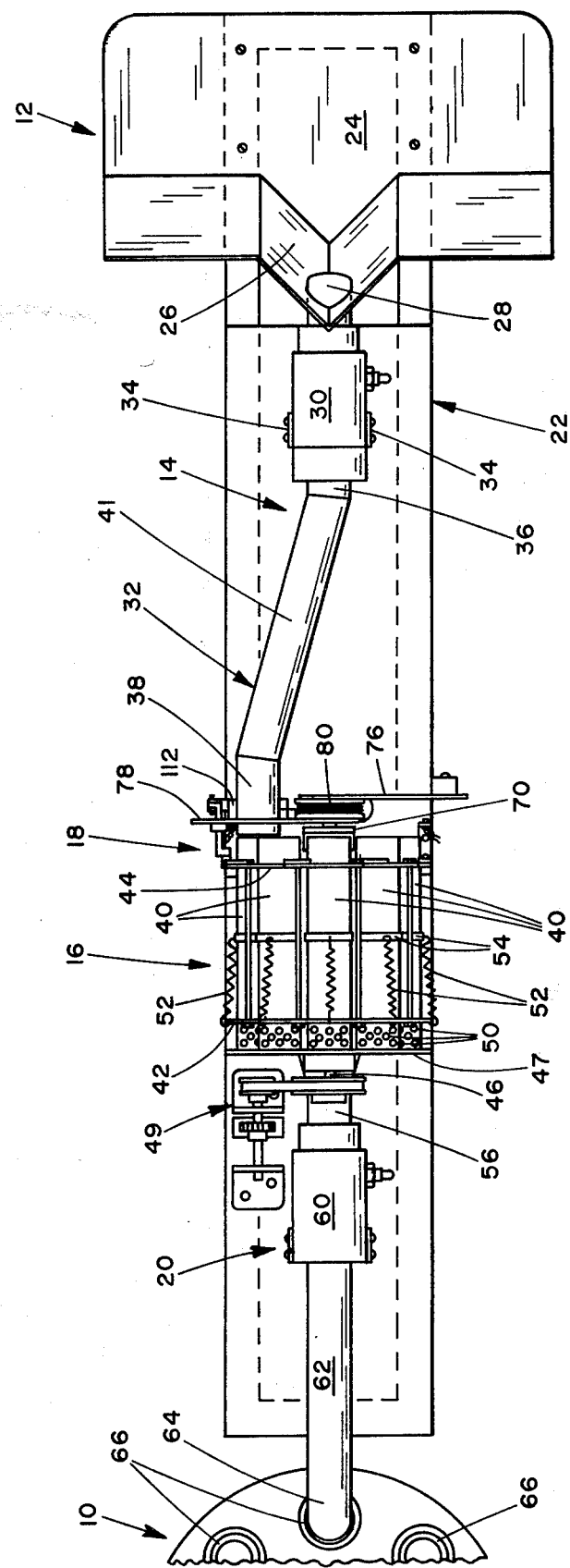
FIG. 2 is a top plan view of the apparatus of FIG. 1.

Referring particularly to FIGS. 1 and 2 of the drawing, reference numeral 10 designates a packaging machine preferably of the type described in copending patent application Ser. No. 908,231, filed May 22, 1978. The apparatus for loading or directing articles to the machine 10 includes an article support and guide assembly 12, a loading tube assembly 14, a magazine assembly 16, an escapement assembly 18 and an ejector assembly 20. The various assemblies are mounted upon a support frame 22.

The article support and guide assembly 12 is designed to include a table top 24 for supporting a plurality of pantyhose garments and an inclined, V-shaped guide surface 26 for facilitating directing a garment to the fixed suction tube 28 of the loading tube assembly 14. An operator stands adjacent the surface 24 for picking up individual garments and feeding them, at random, sequentially, to the open end of suction tube 28. Preferably, the garments are aligned in a generally parallel fashion upon the surface 24 such that an operator can pick up a garment adjacent the waist band and the suction in the tube 28 draws the garment into the tube 28 preferably with the toe portion being drawn in first.

Figure 4:
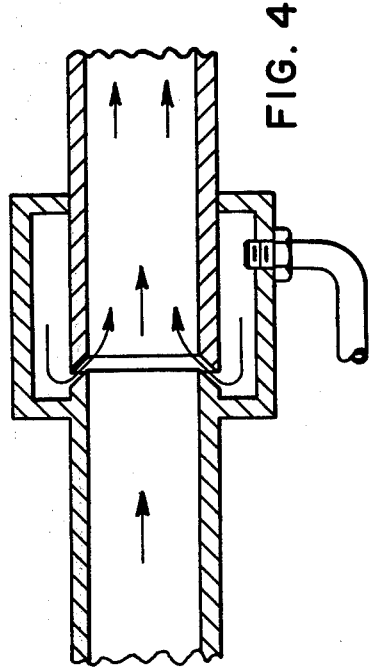
FIG. 4 is an enlarged, cross-sectional view of an air ejector.

The garments are directed individually to the magazine assembly 16 by the loading tube assembly 14 which includes the fixed tube 28, an air ejector 30 and the loading tube 32. The ejector 30, which is of any suitable conventional construction and may be of the type as illustrated by FIG. 4, is fixedly mounted above the table top 24 by a bracket 34 secured to the frame 22. While one end portion of the ejector 30 has the tube 28 secured thereto, the opposite end of the ejector supports, for rotation relative thereto, the loading tube 32. As best shown by FIG. 2, the loading tube 32 includes one end portion 36 which is axially aligned with and supported for rotation, in a conventional manner, relative to the ejector 30, a second end portion 38 which is parallel to and radially offset relative to the axis of rotation of end portion 36, and an elongated intermediate portion 41. Thus the outer end portion 38 of the loading tube 32 is capable of swinging within an arc of approximately 300 degrees, as will be later described. Also, it is to be noted that in the feeding of hosiery garments, for example, the loading tube 32 preferably should be at least as long as the length of the garments being directed therethrough.

Figure 3:
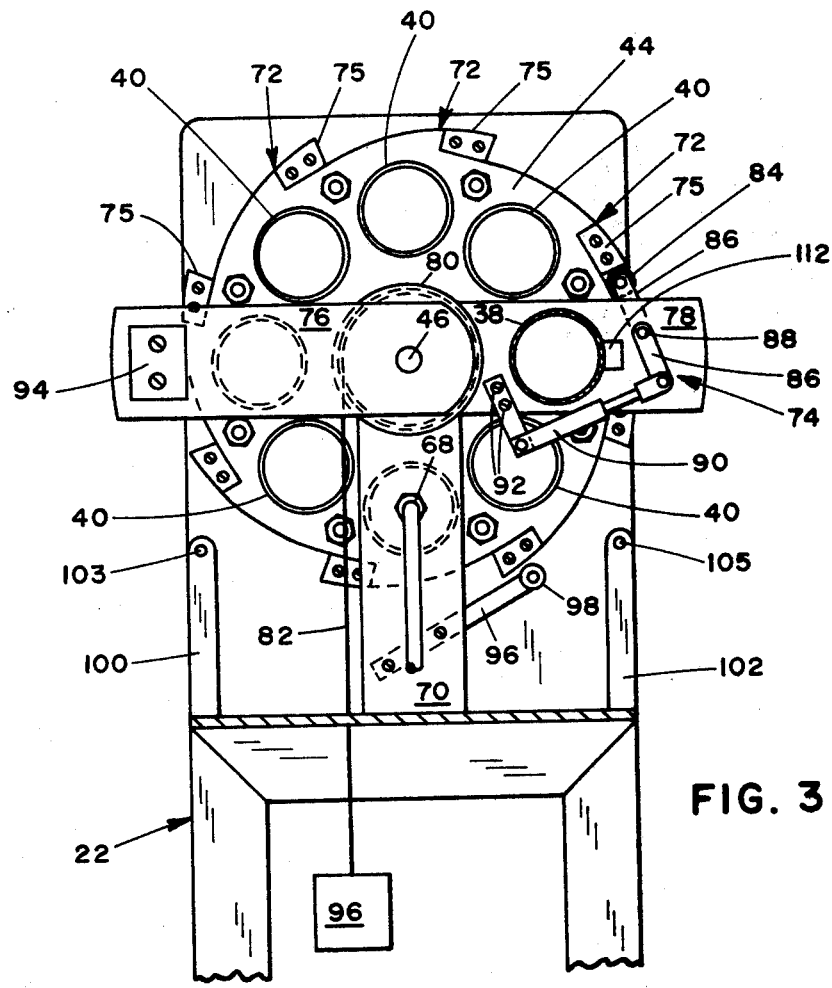
FIG. 3 is a view taking a long line 3—3 of FIG. 1.

The magazine assembly 16 includes a plurality of storage cylinders 40 arranged parallel to each other in a generally circular arrangement, see FIG. 3. Eight storage cylinders have been illustrated. However, the number of cylinders may vary depending upon the type and size of articles and the speed and proficiency of an operator. The apparatus will be described with the number of storage cylinders 40 being equal to the number of article receiving stations provided on the packaging machine.

The cylinders 40 are supported by spaced, parallel disks 42, 44 and each cylinder is biased into abutment with a fixed plate 47.

Each of the cylinders 40 is slidably supported within aligned openings provided in spaced disks 42 and 44. The disks 42, 44, in turn, are fixed for rotation with and driven upon rotation of shaft 46 which passes axially through the disks. The shaft 46 is driven through conventional drive belt and chain assemblies 49 from the shaft 48, FIG. 1. In turn, the shaft 48 is directly driven from, or in timed relation with, a drive motor 51 which may be the drive motor of a processing machine such as, for example, the packaging machine 10.

The end portion of each cylinder 40 intermediate the fixed, plate 47 and the disk 42 is provided with a plurality of apertures 50. The apertures 50 in each storage cylinder 40 are large enough to permit the escape of air therethrough as a garment or other article is forced along the cylinder by air pressure, and small enough to retain the garment or article within the storage cylinder.

A tension spring 52 is provided for each storage cylinder 40 for urging the cylinders 40 to the left, FIGS. 1 and 2. One end of each spring is attached to the disk 42 while the other end is attached to a collar 54 encircling and fixed to an associated cylinder 40. Upon rotation of the disks 42, 44 and the cylinders 40 about shaft 46, ends of the cylinders slidably engaged the fixed plate 47. The plate 47 is provided with opening 53 in the lower portion thereof for permitting a garment or other article to pass therethrough upon being discharged from the cylinders 40 as the cylinders rotate about shaft 46 to a position in alignment with the plate opening.

The discharge tube assembly 20 includes a first conduit 56 fixed relative to the rotary magazine assembly and having a flared end portion 58 and an end portion connected to a fluid ejector 60. The flared end portion 58 encompasses the opening 53 in stationary plate 47 for receiving and guiding garments or other articles forced from temporary storage cylinders 40 and through the opening in plate 47. A discharge tube 62 has one end attached to the ejector 60 while the opposite end 64 directs the garment or article to a desired location, which, as shown by FIGS. 1 and 2, is positioned to sequentially discharge articles into the open upper ends of loading tubes 66 displacable along a path below the tube end 64.

The ejector 60 which may be of the type illustrated schematically by FIG. 4, serves to create air currents within a particular storage cylinder 40 having a garment or other article therein and aligned with a conduit 56 and the opening 53 through plate 47 for removing the article from the cylinder 40 and directing it from the end 64 of conduit 62. An air nozzle 68, FIG. 3, operates in timed relation with the ejector 60 and serves to assist the ejector in removing an article from the lowermost cylinder 40, FIGS. 1 and 2, by directing an air blast into the open end of the cylinder. The nozzle 68 is fixedly mounted upon the bracket 70 which supports one end of shaft 46.

Figure 5:
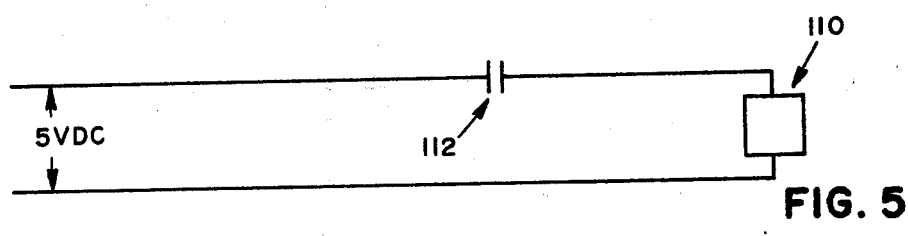
FIG. 5 is a schematic electrical diagram of the apparatus for controlling the air cylinder of the roller latch.
Figure 6:
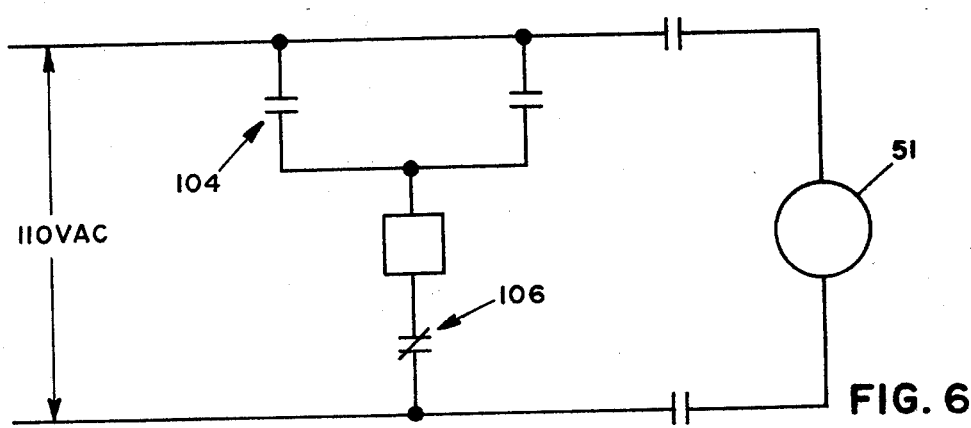
FIG. 6 is a schematic electrical diagram of the system for controlling the drive to the rotatable turret carrying the storage cylinders.
Figure 7:
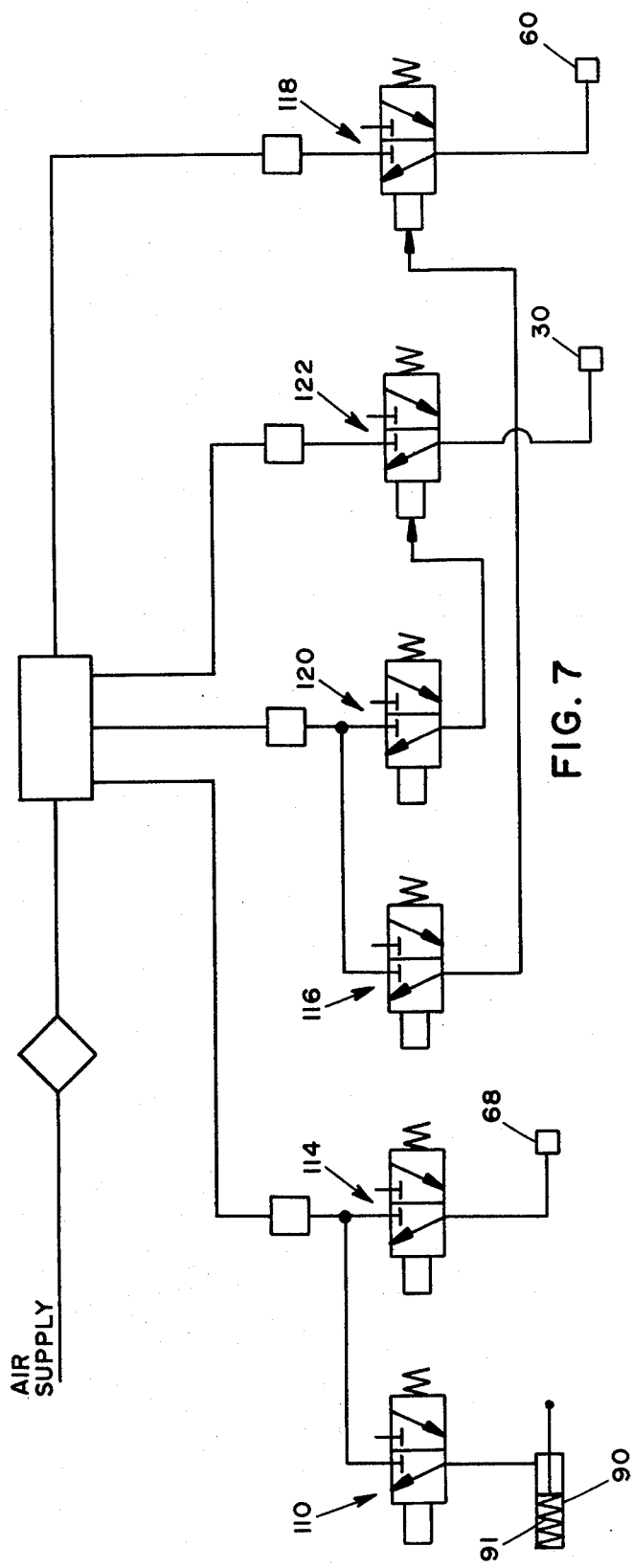
FIG. 7 is a schematic diagram illustrating the various fluid systems of the article handling apparatus.

The escapement assembly 18 includes a plurality of teeth or stop shoulders 72 equally spaced around the outer periphery of the rotatable disk 44, as best illustrated by FIG. 3, and a cylinder operated latch assembly 74. The number of shoulders 72 corresponds to the cylinders 40 in the magazine. Each shoulder is provided with a stop or bumper 75 which preferably is of rubber or other suitable construction. The latch assembly 74 includes a support consisting of arm sections 76, 78 and a drum 80 secured together and fixed upon shaft 46 for rotation therewith. The arm section 78 is provided with an opening, having a diameter substantially corresponding to the outer diameter of the tube end portion 38, for receiving and supporting the outer end of loading tube 32. A latch roller 84, FIG. 3, is mounted upon linkage 86, which, in turn, is pivotably mounted upon a pin 88 passing through arm section 78. The latch roller 84 is actuated by a fluid cylinder 90, rigidly secured to the arm section 78 by fastener 92, and coupled to the linkage 86. A counterbalance weight 94 is secured to the outermost end of arm section 76. The escapement assembly 18 including arm sections 76, 78 and latch assembly 74 are urged in a counterclockwise direction, FIG. 3, by means of a flexible member 82 wound around drum 80 and having a weight 96 attached to the opposite end portion. This urges the latch roller 84 into engagement with an abutment 75 at all times except during brief actuation of fluid cylinder 90 whereby the roller 84 moves outwardly over the engaged abutment 75. Fluid pressure in the cylinder 90 operates to lift roller 84 over a shoulder 75, and since the fluid cylinder is of the type provided with a return spring 91 for pivoting the linkage 86 and urging the roller 84 radially inwardly into engagement with an adjacent stop member 75. The fluid cylinder 90 is actuated by solenoid controlled valve 110, FIG. 7, which is controlled by a photoelectric sensor 112, FIGS. 3 and 5, in response to the displacement of an article or garment through the loading tube 32.

The arm 96, having a roller 98 mounted on the outer end, is fastened to bracket 70 and serves as a safety device to engage linkage 86 and raise latch roller 84 out of engagement with the abutments 75 when the escapement assembly rotates clockwise, FIG. 3, and rotation is not arrested by the control system to be subsequently described.

Supported from the frame assembly 22 is a pair of spaced, upstanding supports 100, 102, each having a sensor mounted adjacent the upper end. The support 100 houses the sensor 103 of a photocell 104, which is adapted to be actuated by the positioning of arm 78 and the support 102 houses the sensor 105 of photocell 106 which is actuated upon rotation of assembly 74 to a prescribed location.

While the revolutions per minute of the magazine and the turntable supporting loading tube 66 may vary, depending upon the desired results and the limitations of the various components, a garment must be discharged from a cylinder 40 by air currents and directed into a loading tube 66 of machine 10 as each tube 66 passes beneath the open end of discharge tube 62. If a garment is not discharged into a loading tube 66 as it is positioned beneath the discharge tube 62, the drive for the machine 10 must stop to prevent processing of unfilled containers. Termination of the drive motor 51 of machine 10 also stops rotation of the magazine assembly 16 due to the connections 48, 49 which drive the rotation of the tubes 66 and the cylinders 40 in timed relation.

The number of cylinders 40 supported by the magazine disks 42, 44 may vary depending upon the efficiency and/or average loading pace of an operator. Since an operator feeds the garments to the suction tube 28 at varying rates, the magazine must be capable of temporarily storing garments within the cylinders in order to insure that garments are discharged sequentially from the magazine at a constant rate.

The operation of the system will be described with respect to a specific example. Assuming that the loading tubes 66 pass beneath discharge tube 62 at the rate of 60 per minute, an operator must be capable of feeding an average of 60 garments per minute to a suction tube 28. However, the operator feeds garments at widely varying rates, possibly a maximum rate of 70 garments per minute for a short period of time and at a slower rate of from 0 to 60 garments per minute. Considering that the magazine has eight cylinders and the machine 10 has eight loading tubes, the loading tube turntable and the magazine 16 must rotate at 7.5 revolutions per minute in order to package 60 garments per minute.

As an operator feeds a garment to the entrance of loading tube 26, air currents generated by the air amplifier 30 forces the garment through tube 32 and into an empty cylinder 40 which is aligned with the end 38 of loading tube 32. Air pressure escapes from the cylinder through openings 50. Normally, the escapement assembly 18 is being driven clockwise, FIG. 3, with the driven disk 44 of the magazine since a shoulder or stop abuts the latch roller 84. As the garment passes the sensor of photocell 112 mounted adjacent the end of loading tube 32, the solenoid valve 110 is activated which controls the fluid cylinder 90 thus instantaneously and temporarily displacing latch roller 84 outwardly of the adjacent stop member 75 permitting the arms 76, 78 and latch assembly 74 to rotate counterclockwise, due to the weight 96 which acts upon drum 80, until the latch roller abuts the next adjacent stop member 75. If the operator feeds garments at a constant rate of 60 per minute, the escapement mechanism would oscillate within an angle of approximately 40°-45° degrees generally in the same area. Assuming that the operator feeds garments at a greater rate, for example 70 garments per minute, the escapement assembly must rotate counterclockwise at a rate of 1.25 revolutions per minute relative to the clockwise rotation of the magazine assembly 16 to present 70 loading cylinders per minute to the operator for loading. The escapement assembly 18 of the present invention cannot rotate continuously and must rotate or oscillate within an arc of approximately 300°. In the event the escapement assembly rotates counterclockwise, a direction counter to the rotation of cylinder 40 until all available cylinders 40 are filled, the photocell sensor 103 detects the presence of arm 78 and the air source directed to amplifier 30 is deactivated. If the operator does not feed garments, the escapement remains at a generally fixed position relative to the rotating magazine assembly. When the last garment in the cylinder 40 immediately preceding the arm 78 is ejected from the cylinder 40, the sensor 105 will detect the presence of arm 78 and through photocell 106 stop the drive motor 51. The drive motor 51 remains deactivated while the sensor 112 is awaiting another garment to be fed into the loading tube. As soon as a garment is advanced through the loading tube and detected by sensor 112, the loading tube 32 immediately steps backward (counterclockwise, FIG. 3) to present the loading tube to a new and open magazine tube 40. This continues for all eight magazine tubes or until the loading tube has been rotated counterclockwise approximately 300 degrees. When the photocell 104 is actuated due to the presence of arm 76 adjacent sensor 103, the motor 51 and machine starts and it continues to run until the loading tube moves approximately 300 degrees in the other direction until arm 78 is detected by sensor 105 of photocell 106.

The solenoid operated valve 114 and the solenoid operated valves 116, 118 are operated in timed relation with the rotation of the magazine 16 and/or the machine 10 in a conventional manner to provide an air blast at 68 and air currents through amplifier 60, respectively. Solenoid operated valves 120 and 122 control the air applied to amplifier 30.

It is to be noted that the escapement assembly may be urged in a counterclockwise direction by a spring or other suitable means, rather than a weight, and the passage of a garment through loading tube 32 may be detected by a switch arm rather than a photocell.

What is claimed is:

1. An article handling system for receiving a plurality of discrete articles fed sequentially thereto at random rates of feed by a operator, and discharging the articles therefrom sequentially at a constant rate of feed comprising; support means, a magazine assembly mounted upon said support means and including a series of discrete article receivers mounted for displacement along an endless path, driving means for displacing said series of receivers along said endless path, loading tube means including a tube having a discharge outlet mounted for displacement along a predetermined path conforming to at least a segment of said endless path for alignment with selected article receivers within said endless path segment, said loading tube means further including means for conveying articles through said loading tube and into said receivers, means for controlling displacement of said discharge outlet along said endless path for sequential alignment with selected article receivers upon displacement of articles through said loading tube means, and ejector means for discharging sequentially, articles from the receivers at a constant rate of feed when the receivers reach a predetermined location along said endless path.

2. An article handling system as recited in claim 1 wherein said plurality of discrete article receivers are displaceable along a circular path and said discharge outlet is displaceable along an arcurate path conforming to at least a segment of said circular path, and wherein said driving means displaces said series of receivers along said circular path in a first direction at a first rate of travel, and said discharge outlet moves along said arcurate path either in said first direction with said series of receivers at said first rate of travel, or in a direction counter to said first direction and at a rate of travel greater than said first rate of travel.

3. An article handling system as recited in claim 1, said series of article receivers being arranged in generally parallel relation for rotation in said endless path about a common axis, said magazine assembly means further including a plurality of spaced members for slidably supporting said series of article receivers.

4. An article handling system as recited in claim 3, said means for controlling displacement of said discharge outlet along said predetermined path including an escapement means biasing said discharge outlet along said predetermined path in a direction counter to the direction of rotation of said article receivers.

5. The article handling system as recited in claim 4, said escapement means including a series of stop shoulders provided upon one of said plurality of spaced members for slidably supporting said series of receivers, and a displaceable member normally urged into abutting relation with a stop shoulder, said escapement means further including means sensing the displacement of an article through said discharge outlet for actuating said displaceable member to permit displacement of said discharge outlet in a direction counter to said direction of rotation of said receivers to the next available empty receiver.

6. An article handling system as recited in claim 1, and further including means for limiting the extent of displacement of said discharge outlet along said predetermined path.

7. An article handling system as recited in claim 1, said ejector means including fluid means for discharging an article from a receiver and conveying the article through a discharge tube upon displacement of a receiver to a prescribed location.

8. An article handling system as recited in claim 7, wherein each of said receivers includes a cylindrical member having open ends, one open end being capable of alignment with said discharge outlet and the other open end abutting a stop member, said stop member being provided with an opening therethrough at said prescribed location for alignment with a receiver positioned at said prescribed location.

9. The method of handling and advancing articles for subsequent processing comprising the steps of; feeding sequentially, at random rates of feed, a plurality of articles along a prescribed, displaceable path, selectively controlling the position of the prescribed path for alignment with an empty receiver of a series of receivers displaceable in a first direction along an endless path, directing each discrete article to an empty receiver, and discharging sequentially discrete articles from the receivers at a constant rate of feed as the receivers are displaced past a prescribed location along said endless path.

10. The method of handling and advancing articles as recited in claim 9, wherein said endless path comprises a circular path and said receiver rotates about a common axis, and wherein each discrete article is directed to an empty receiver by varying the positioning of said prescribed path relative to the receivers rotating within the circular path.

11. The method of handling and advancing articles as recited in claim 10, wherein the prescribed path is displaceable counter to the first direction of rotation of the receivers when the rate of feed of articles along the prescribed path exceeds the constant rate of feed of the articles from the receivers as the receivers are displaced passed the described location.

12. The method of handling and advancing articles as recited in claim 11, where in the prescribed path is displaceable in the first direction when the constant rate of feed of the articles from the receivers exceeds the rate of feed of articles along the prescribed path.

13. In an apparatus for handling and advancing articles, conduit means, means for advancing sequentially a plurality of articles along said conduit means at a variable feed rate, a plurality of receivers rotatable about a common axis in a first direction for receiving articles advanced along said conduit means, means for discharging sequentially articles from said plurality of receivers at a constant rate, and means for controlling the positioning of said conduit means relative to said plurality of rotatable receivers in response to the frequency of advancement of articles along said conduit means.

14. In an apparatus for receiving a plurality of discrete articles fed sequentially at random rates of feed and discharging articles therefrom sequentially at a constant rate of feed, magazine means including a series of discrete article receivers displaceable along an endless path in a first direction and at a constant rate of feed, loading tube means including a discharge end portion displaceable along a predetermined path for alignment with the receivers, and means for controlling the displacement of said loading tube means discharge end at varying rates of feed in directions with and counter to said first direction in response to the rate of articles through said loading tube means.

* * * * *